United States Patent [19]

Henderson

[11] Patent Number: 4,779,318
[45] Date of Patent: Oct. 25, 1988

[54] MULTIPLE SPINDLE MACHINE HAVING INDEPENDENTLY VARIABLE SPEED AND FEED RATES

[75] Inventor: Douglas J. Henderson, New Britain, Conn.

[73] Assignee: Litton Industrial Automation Systems, Inc., New Britain, Conn.

[21] Appl. No.: 854,938

[22] Filed: Apr. 23, 1986

[51] Int. Cl.$^4$ .............................. B23B 9/04
[52] U.S. Cl. .................... 29/38 B; 82/1 C; 82/3; 82/DIG. 7
[58] Field of Search ............... 29/37 R, 38 B, 563, 29/38 A; 82/3, 1 C, DIG. 7, 30; 409/165, 198, 221

[56] References Cited

U.S. PATENT DOCUMENTS

| | | | |
|---|---|---|---|
| 2,518,813 | 8/1950 | Pearson | 27/37 R |
| 3,116,537 | 1/1964 | Boner | 29/44 |
| 3,203,316 | 8/1965 | Cashman et al. | 82/3 X |
| 3,656,377 | 4/1972 | Kosem | 82/1 C |
| 3,864,994 | 2/1975 | White | 82/3 |
| 3,922,936 | 12/1975 | Link | 82/28 R |
| 3,946,298 | 3/1976 | Van de Loo | 82/3 |
| 3,990,133 | 11/1976 | Schalles et al. | 82/3 |
| 4,061,060 | 12/1977 | Trautmann | 82/3 |
| 4,133,230 | 1/1979 | Inaba et al. | 82/28 R |
| 4,159,660 | 7/1979 | Buckley et al. | 82/3 |
| 4,253,359 | 3/1981 | Youden | 82/2 B X |
| 4,351,096 | 9/1982 | Depweg et al. | 29/38 A |
| 4,534,686 | 8/1985 | Nakamura et al. | 409/135 |

Primary Examiner—Z. R. Bilinsky
Attorney, Agent, or Firm—Brian L. Ribando

[57] ABSTRACT

A multiple spindle machine includes a plurality of spindles mounted in a spindle assembly which sequentially indexes workpieces through a plurality of spindle stations by rotating the spindle assembly around its axis. The control and drive system for the multiple spindle machine includes a first variable speed motor for driving the spindles and a second variable speed motor for driving a camshaft. The camshaft drives the indexing mechanism and a main cam which reciprocates a tool slide and a first set of tools mounted on the tool slide relative to the spindle assembly. A second set of tools is mounted around the spindle assembly and independent NC motors drive the second set of tools. A microprocessor independently controls the speed of the first and second variable speed motors and the NC motors to provide flexible control of the multiple spindle machine.

11 Claims, 7 Drawing Sheets

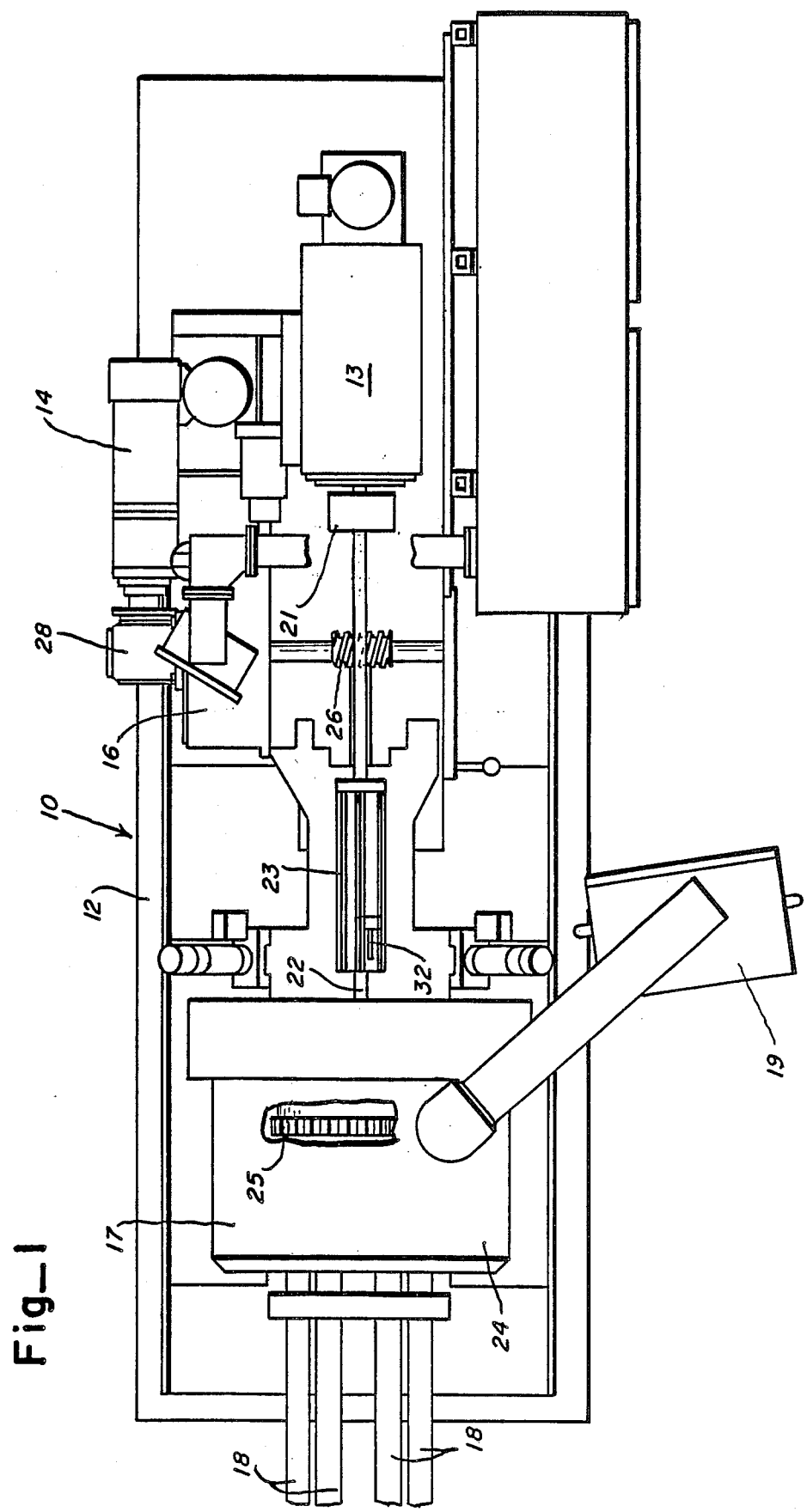
Fig_1

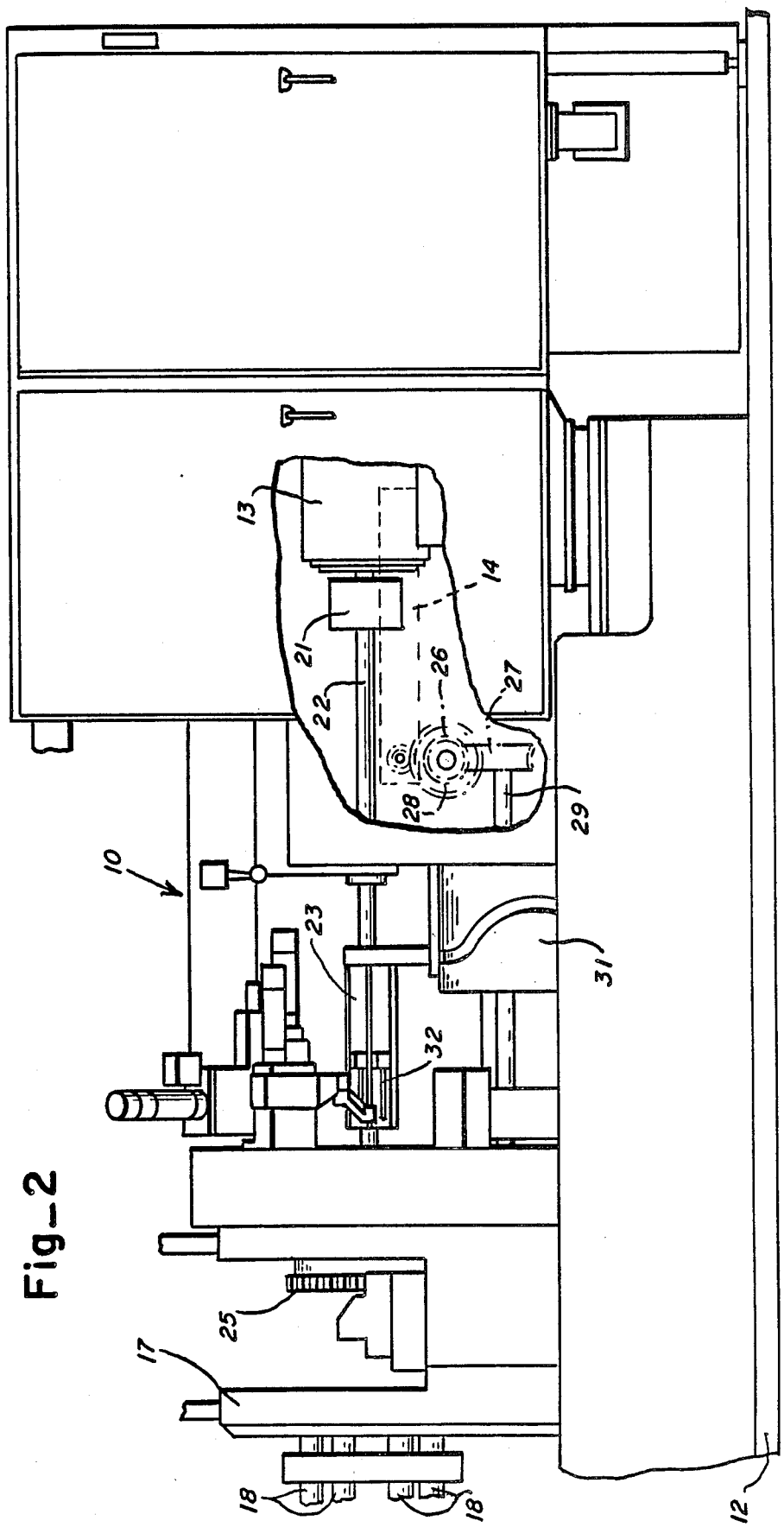
Fig_2

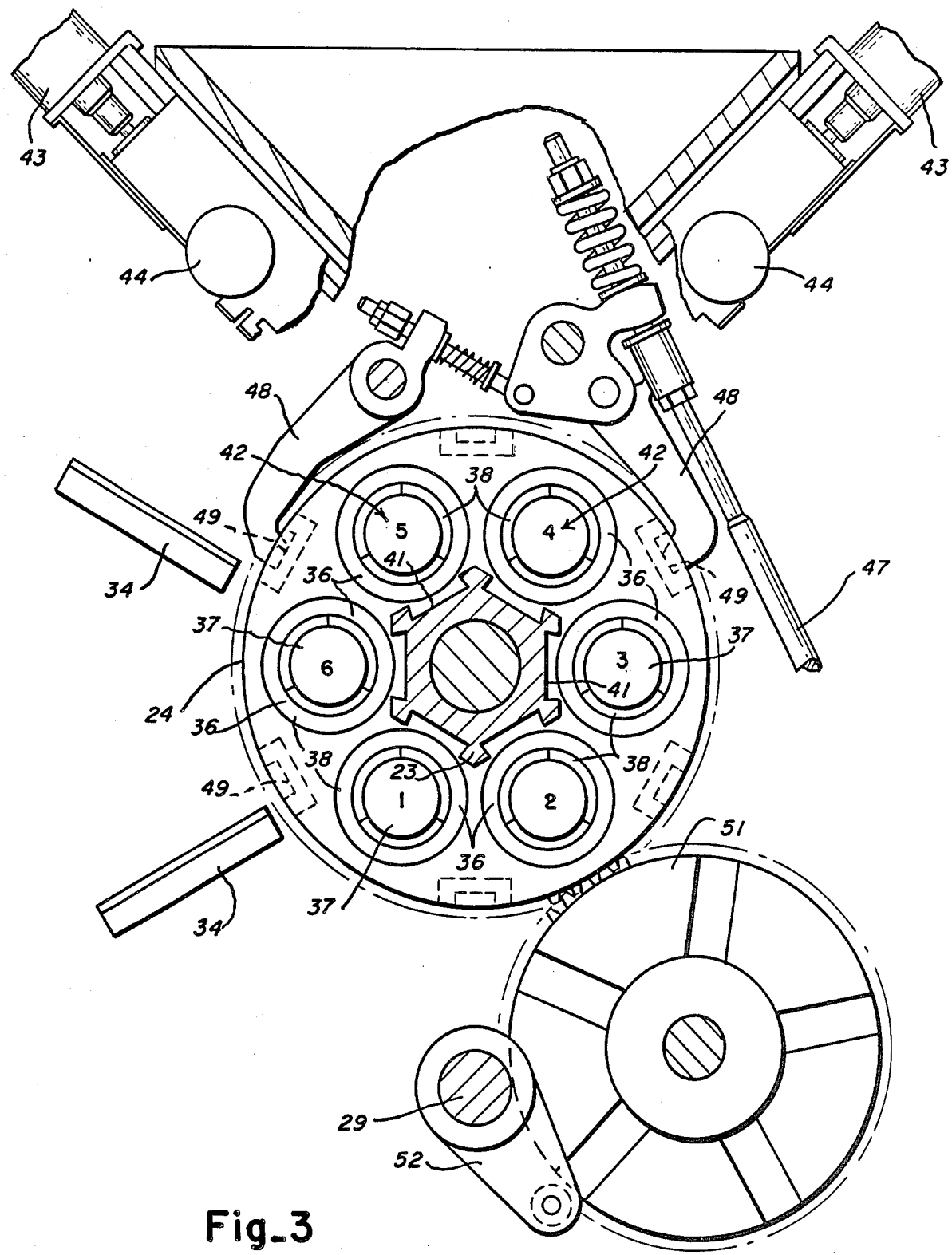
Fig_3

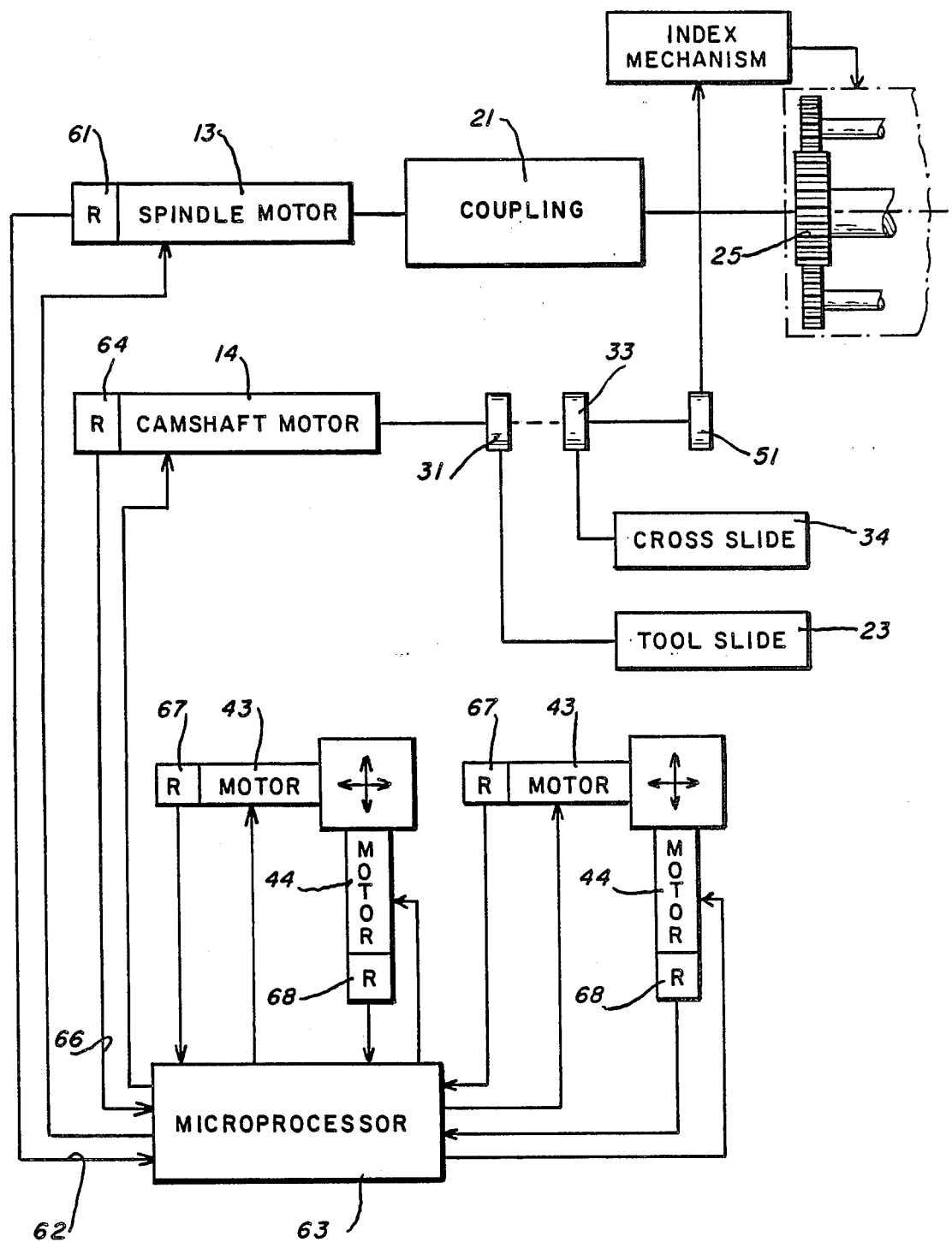
Fig_4

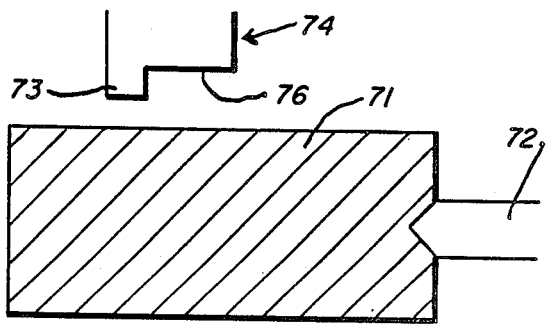
Fig_5A
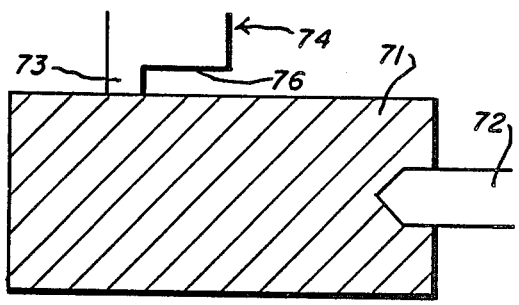
Fig_5B
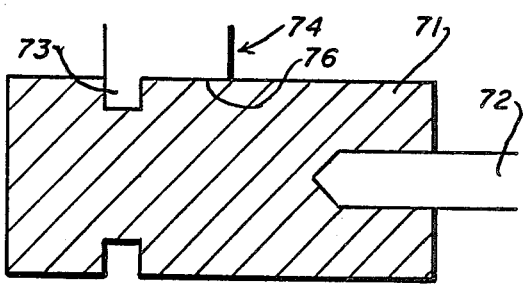
Fig_5C
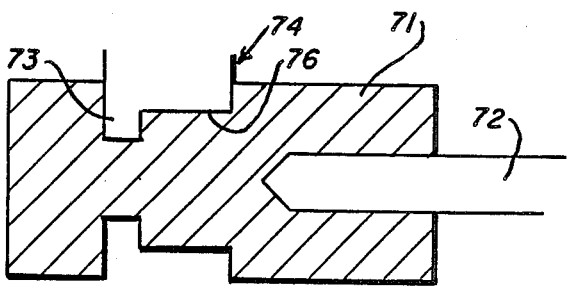
Fig_5D

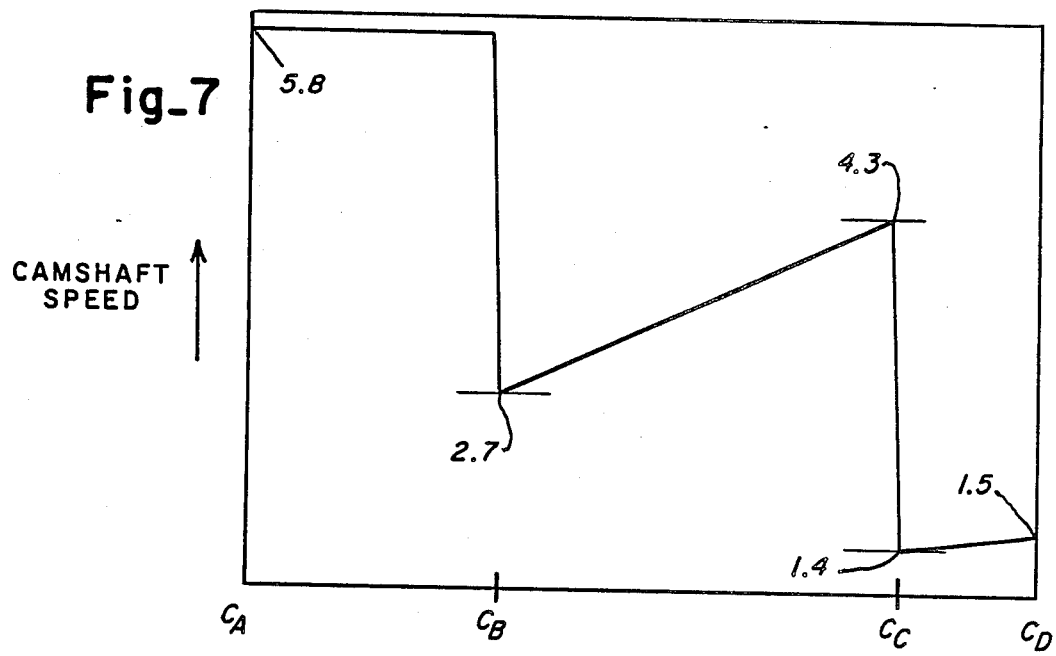
Fig_7
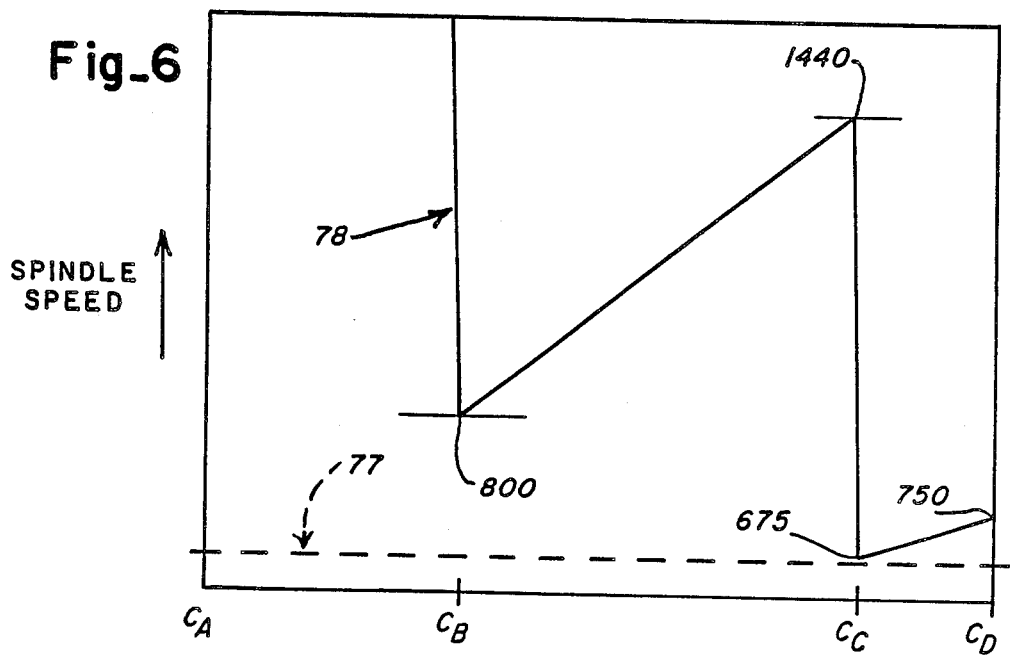
Fig_6

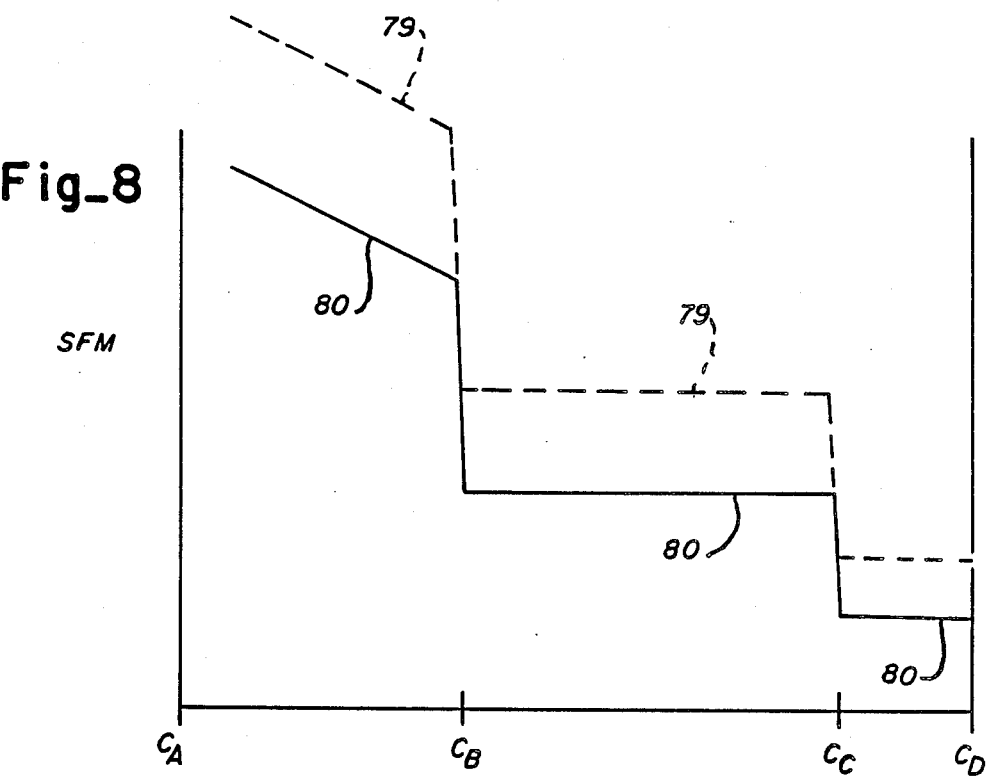
Fig_8
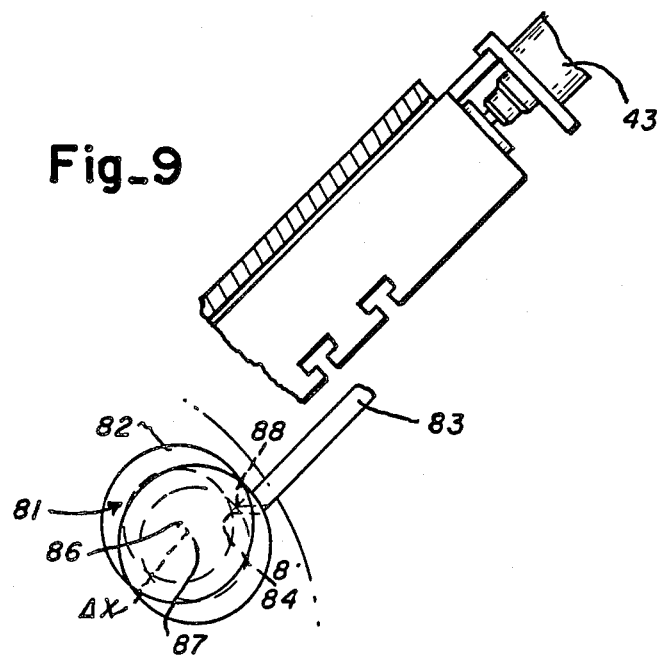
Fig_9

4,779,318

MULTIPLE SPINDLE MACHINE HAVING INDEPENDENTLY VARIABLE SPEED AND FEED RATES

BACKGROUND OF THE INVENTION

This invention relates to a multiple spindle machine having a first variable speed motor for the spindle drive and and a second variable speed motor coupled to the camshaft for the tool feed drive.

A multiple spindle machine comprises an array of tools which perform sequential operations on a plurality of workpieces supported by a circular array of spindles. Means are provided for rotating the individual spindles and the entire spindle assembly, and a separate machining or forming operation is performed on a workpiece at each one of a series of spindle stations.

In machines such as this, power is required (1) to rotate the individual spindles, (2) to rotate or index the spindle assembly around the assembly axis, and (3) to feed tools into contact with the workpiece at the various spindle stations in order to machine the workpiece into the desired finished product.

In most prior art machines, a single constant speed motor is the only motive source for the entire machine. The motor is coupled through a transmission which provides the power to rotate the individual spindles. The motor also provides the power through a camshaft to advance and retract the tools with respect to a workpiece and to rotate or index the spindle assembly around its axis. All functions of the machine are interrelated by the various gears and cams used in the machine. This keeps all functions of the machine in synchronism, resulting in long-term trouble-free operation.

Multiple spindle machines are ideally suited for production runs involving many thousands of identical pieces. Such machines have the disadvantage, however, of requiring the gears, cams, and tools to be changed when there is any change to the geometry of the finished part. The gears must also be changed when it is desired to change the rotational speed of the spindles, or the speed of the camshaft which drives the tools. Changing the gears and cams often takes several days on a prior art machine.

In order to make multiple spindle machines more flexible, it is also known to use a spindle motor to drive the spindles but to eliminate the camshaft and provide separate numerically controlled (NC) motors for actuating all motions of the tools. In this way, changes in tool motion can be made by changing the program controlling the NC motors which actuate the tools. While this system is more flexible, there are several disadvantages: 12 to 15 NC motors are required, NC motors are expensive to manufacture and are prone to malfunction, the program needed to control 12 to 15 NC motors is extremely complex, and NC motors typically do not provide as much torque to feed the tool into the workpiece as does the camshaft in a conventional multiple spindle machine.

It would, therefore, be desirable to provide a multiple spindle machine having greater flexibility than normal prior art camshaft machines but without the disadvantages associated with a fully numerically controlled multiple spindle machine.

SUMMARY AND OBJECTS OF THE INVENTION

According to the invention, a multiple spindle machine includes a first variable speed motor used to drive the spindles through a set of gears, a second variable speed motor used to drive the camshaft which rotates the spindle assembly and feeds the tools into the workpieces at some of the spindle positions, and a plurality of NC motors which directly drive the tools at other spindle positions. The operation of all of the motors is controlled by a microprocessor.

This type of arrangement provides several advantages:
1. Although the speed of rotation of all the spindles is the same, this speed can be altered during a machining cycle independently of camshaft speed;
2. The spindle speed can be altered by altering the speed of the spindle motor without changing the gears in the power case;
3. Although the camshaft rate is the same for all cams, the camshaft rate can be altered by varying the speed of the camshaft motor.
4. Since a camshaft is used to power some of the tools, high torque is available to drive these tools into the workpiece;
5. Tool feed rate can be varied during a machining cycle independently of spindle speed;
6. The operation of the plurality of NC motors can be altered without affecting the operation of the spindles or the camshaft;
7. Spindle speed can be varied during a particular cycle to maintain a constant surface speed as the diameter of the workpiece varies; and
8. Index rate (the rate of rotation of the spindle assembly from one work position to the next work position) can be varied as desired.

It is accordingly an object of the invention to provide a multiple spindle machine having separate variable speed motors which drive the spindles and the camshaft.

It is another object of the invention to provide a multiple spindle machine in which a microprocessor is used to interrelate the operation of the spindle drive motor, the camshaft motor, and certain NC tool drive motors on the machine.

It is another object of the invention to provide a multiple spindle machine having a camshaft motor for driving a first group of tools and additional NC motors for driving other tools.

It is yet another object of the invention to provide a multiple spindle machine which utilizes a camshaft to drive a first group of tools and NC motors to drive other tools whereby the machining operations may be partially varied by changing the program controlling the NC motors.

These and other objects of the invention will become apparent from the following detailed description in which reference numerals used throughout the description correspond to reference numerals appearing on the drawing figures.

BRIEF DESCRIPTION OF THE DRAWINGS

FIG. 1 is a plan view of a multiple spindle machine according to the invention.

FIG. 2 is a front view of the multiple spindle machine of FIG. 1.

FIG. 3 is an end view of the spindle assembly.

FIG. 4 is a schematic drawing of a multiple spindle machine according to the invention.

FIGS. 5A through 5D show a workpiece during four stages of a typical machining operation.

FIG. 6 is a graph of spindle speed during the machining operation used to machine the workpiece of FIG. 5.

FIG. 7 is a graph of camshaft speed during the machining operation used to machine the workpiece of FIG. 5.

FIG. 8 is a graph of the Surface Feet per Minute of the cross slide tool shown in FIG. 5.

FIG. 9 shows the positional error of one of the spindles at the fourth spindle station.

DESCRIPTION OF THE PREFERRED EMBODIMENT

Referring first to FIGS. 1 and 2, there is shown generally a multiple spindle machine generally designated by the reference numeral 10. The machine comprises a base 12, a variable speed spindle motor 13, a variable speed camshaft motor 14, a power case 16, and a spindle frame 17. A multiple spindle machine which machines workpieces in bar stock form is known as a multiple spindle bar machine. Other multiple spindle machines known as chuckers operate on workpieces in discrete form; the present invention is directed to both types of machines.

In the bar machine version of the invention, a plurality of stock feed tubes 18 are attached to the spindle frame 17 and contain bar stock which is fed into a spindle assembly located within the spindle frame 17. The machine is controlled from a control panel 19 which is mounted on the side of the machine. The power case 16 houses a coupling 21 which connects the spindle motor 13 to the spindle shaft 22. The spindle shaft passes through the center of a tool slide 23 which is located between the power case 16 and the spindle frame 17 and drives the individual spindles 36 through a gear secured on the end of the spindle shaft 22 as is well known in the art. The power case 16 also houses a worm 26 which is driven by the camshaft motor 14 through a right angle drive 28, aand which engages a worm gear 27. The worm gear 27 is attached to one end of a camshaft 29 which drives a main cam 31 secured to the middle region of the camshaft 29. The main cam 31 reciprocates the tool slide 23 upon which various tools are mounted, and the camshaft acting through other cams drives tools which are mounted on cross slides 34 around the spindle assembly 24 as is well known in the art.

Turning now to FIG. 3, it will be seen that the spindle assembly 24 comprises a circular array of six spindles 36 each of which is mounted for rotation within the spindle assembly 24. Each spindle 36 includes a centrally mounted collet 38 which receives a workpiece (not shown). As shown on the drawing, the spindle positions are numbered 1 through 6 in a counterclockwise direction beginning at the seven o'clock position on the spindle assembly. During a machining operation, the spindle assembly is incrementally advanced through the six positions, with the sixth position typically being a cutoff or ejection station where the finished part is removed from the collet.

In a bar machine configuration, each spindle 36 receives stock material 37 which is automatically fed from the stock feed tubes 18 into the collet 38. The tool slide 23 is mounted on the axis of the spindle assembly and a plurality of ways 41 are formed on the surface of the tool slide 23 for the reception of tools such as tool 32 is well known in the art.

The tool slide 23 is driven by the main cam 31 in a back and forth direction which is parallel to the axis of the spindle assembly 24. The tools which are mounted on the cross slides 34 are driven by other cams actuated by the camshaft 29 but move in a direction which is perpendicular to the axis of the spindle assembly 24. At the fourth and fifth spindle positions 42, NC motors 43 drive tools in a direction which is perpendicular to the axis of the spindles; and NC motors 44 drive tools in a direction which is parallel to the axis of the spindles. During a machining operation, the tools are fed into the workpieces 37 which are held in the collets 38 of the spindle assembly in order to cut and shape the workpieces as desired.

The index mechanism on a multiple spindle machine controls the rotation of the spindle assembly 24 and locks the spindle assembly against rotation so that the various machining operations can be performed on the workpieces. The index mechanism is located within the spindle frame 17 adjacent the spindle assembly and comprises an actuating rod 47 which controls one or more locking levers 48. The locking levers normally engage detents 49 located on the circumference of the spindle assembly to maintain the spindle assembly in a fixed position during a machining operation. The actuating rod is operated by the camshaft through a mechanism as is well known in the art. The actuating rod 47 causes the locking levers 48 to disengage the detents 49 allowing the spindle assembly 24 to be indexed by a Geneva gear 51 to the next position as shown in FIG. 3. The Geneva gear 51 is rotated by an arm 52 which is mounted on the end of the camshaft 29.

Turning now to FIG. 4, the control system for the multiple spindle machine of the instant invention is shown in greater detail. The spindle motor 13 is connected through the coupling 21 in the power case 16 and through the spindle shaft 22 to a gear assembly which drives the individual spindles 36 in the spindle assembly. Rotation of the spindle motor 13 is monitored by a first resolver 61 which provides a first input 62 to a microprocessor 63.

The camshaft motor 14 is coupled to the camshaft 29 of the multiple spindle machine, and rotation of the camshaft motor 14 is monitored by a second resolver 64 which provides a second input 66 to the microprocessor 63. The camshaft 29 drives the main cam 31 and a plurality of secondary cams 33. The main cam reciprocates the tool slide 23 along the axis of the spindle shaft 22, and a plurality of the secondary cams 33 actuate tools mounted on the cross slides 34. As described above in greater detail, the actuating rod 47 controls the index locking mechanism for the machine. The spindle assembly 24 is rotated during indexing by the arm 52 on the end of the camshaft which drives the Geneva gear. The speed of both the spindle motor 13 and the camshaft motor 14 is controlled by the microprocessor 63.

At the fourth and fifth spindle positions, the NC motors 43 and 44 are used to drive the tools for both radial and axial cutting or forming operations. As shown, two NC motors 43 and 44 and two resolvers 67 and 68 are located at each position. Each NC motor is coupled to a resolver, and all of the motors and resolvers are coupled to the microprocessor.

MODE OF OPERATION OF THE PREFERRED EMBODIMENT

All operations of the multiple spindle machine are controlled by the microprocessor 63. The microprocessor 63 provides input drive signals to the spindle motor 13, the camshaft motor 14, and the NC tool drive motors 43 and 44. Additionally, the microprocessor 63 monitors the rotation of the spindle motor 13 and the camshaft motor 14 by means of the resolvers 61 and 64, respectively, and of the NC motors 43 and 44 by means of the resolvers 67 and 68.

During a standard machining operation at any spindle station, the camshaft 29 turns through an angle of 110 degrees while driving the cam driven tools. During indexing of the spindle assembly from one spindle station to the next, the camshaft turns through an angle of 250 degrees. Using the microprocessor 63, the camshaft motor 14 can be stopped before the spindle carrier is unlocked to be indexed to the next position; and the NC motor controlled tools at the fourth and fifth position can be used to operate on the workpieces. If desired, the microprocessor can also vary the spindle speed during the NC motor driven tool machining if desired.

Other advantages of the multiple spindle machine of the invention may be best understood by reference to an example. FIGS. 5A through 5D show a machining operation performed on a workpiece 71 with a given set of cams at a single spindle station. For the purposes of this example, it will be assumed that the machining is being performed at one of the stations 1, 2, 3, or 6, where the tools are camshaft driven. FIG. 5A shows the workpiece 71 at the beginning of machining, and FIG. 5D shows the workpiece at the end of machining. FIGS. 5B and 5C show the workpiece 71 at intermediate states during machining.

In FIG. 5A, a drill 72 begins to drill a hole along the axis of the workpiece. The maximum allowable surface speed of the workpiece relative to the drill is 105 SFM (Surface Feet per Minute), and the maximum feed rate of the drill 72 into the workpiece is 0.006"/Rev (0.006 inch per Revolution). The 105 SFM allows a spindle speed (and, accordingly, a workpiece rate of rotation) of 1600 RPM. FIG. 6 shows the relationship of spindle speed to camshaft angle during the machining operation of FIGS. 5A through 5D. FIG. 6 shows an initial spindle speed of 1600 RPM.

In FIG. 5B, the tool 73 of the cutting tool 74 beings to cut into the workpiece. The maximum allowable surface speed of the workpiece relative to the tooth is 252 SFM, and the maximum allowable feed rate of the tooth into the workpiece is 0.0037"/Rev. Because the portion of the workpiece in contact with the tooth 73 is greater in diameter than the portion of the workpiece in contact with the drill 72, the 252 SFM allows a spindle speed of only 800 RPM. FIG. 6 shows a decrease in spindle speed from 1600 RPM to 800 RPM at camshaft angle $C_B$.

As the tooth 73 cuts into the workpiece, the diameter of the contact area between the workpiece and the tooth 73 decreases; and the spindle speed may be increased without exceeding the 252 SFM. Accordingly, as the tooth 73 cuts into the workpiece, the spindle speed may be increased from 800 RPM to 1440 RPM. FIG. 6 shows the spindle speed increase from 800 RPM to 1440 RPM from camshaft angle $C_B$ to $C_C$.

In FIG. 5, the blade 76 of the cutting tool 74 begins to cut into the workpiece 71. The maximum allowable surface speed of the workpiece relative to the blade 76, owing to the larger cutting area of the blade, is 180 SFM. The maximum allowable feed rate of the blade and tooth combination into the workpiece is 0.0025"/Rev. The 180 SFM limits the spindle speed to 675 RPM. As the blade 76 of the tool cuts into the workpiece, the diameter of the contact area between the workpiece and the blade decreases; and the spindle speed may be increased without exceeding the 180 SFM. As shown in FIG. 6, the spindle speed is increased from 675 RPM to 750 RPM from camshaft angle $C_C$ to $C_D$.

The maximum SFM for the various machining operations are limited, which if exceeded, will result in a burned or broken tool, an uneven cut on the workpiece, or an otherwise unsatisfactory finished workpiece. When using a multiple spindle machine in which the spindle speed is not variable, the spindle speed must be kept at an RPM which will not exceed the maximum SFM in any portion of the machining operation. In the example shown in FIGS. 5 and 6 and described above, an RPM of 660 is required in order not to exceed an SFM of 180 at camshaft angle $C_C$. As a result, an RPM of 660 as shown by the dotted line 77 in FIG. 6 would have to be maintained during the entire machine operation when using a non-variable speed machine.

As the spindle speed is varied, the camshaft speed may also be varied in order to maintain a constant rate of penetration (expressed in inches/revolution) of the tool. The ability to vary the camshaft speed during a machining operation yields a tremendous advantage; the workpiece can be machined in less time.

FIG. 7 is a graph of the rate of camshaft rotation during the machining operation shown in FIG. 5. The camshaft rate of rotation is changed at camshaft angle $C_B$ from 5.8 revolutions per minute (R/m) to 2.7 R/m. The camshaft rate of rotation then increases linearly to 4.3 R/m at camshaft angle $C_C$ and decreases to 1.4 R/m. From camshaft angle $C_C$ to $C_D$, the camshaft rate of rotation again increases from 1.4 R/m to 1.5 R/m.

The changes in the camshaft rate or rotation allows the rate of penetration of the tool 74 relative to the workpiece 71 to remain constant over a given camshaft angle although the rate of spindle rotation (and hence workpiece rotation) varies as shown in FIG. 6. The ability to maintain a constant rate of penetration is a feature which may be utilized in order to optimize machining cycle time. Of course, if desired, the rate of camshaft rotation may also be kept constant during a machining operation.

FIG. 8 is a graph of cutting rate (SFM) of the tool 74 into the workpiece 71 shown in FIG. 5. The upper broken line 79 shows the SFM of the blade portion 76 of the tool 74, and the lower solid line 80 shows the SFM of the tooth portion 73 of the tool.

Initially, from camshaft angle $C_A$ to $C_B$, the tool 74 is out of contact with the workpiece 71, and the SFM is optimized for the drill 72 since the tool 74 is cutting air. At camshaft angle $C_B$, the SFM of the tooth portion 73 drops to 252, and this SFM is maintained at this rate until the camshaft is at angle $C_C$. At angle $C_C$, the SFM of the blade portion 76 drops to 180, and the 180 SFM is maintained until the camshaft is at angle $C_D$.

A conventional six spindle machine operates simultaneously on six workpieces and produces six finished parts in the same amount of time required by a single spindle machine to produce on finished part. As a result, if a large number of identical parts are to be produced, typically in the thousands, the multiple spindle machine is capable of producing the part for the least cost since the production time per part is substantially less than with a single spindle machine. This is in spite of the fact the multiple spindle machine requires an extensive set-up time of 10-20 or more hours in order to mount and adjust the various gears, linkages, cams, and cam followers which are normally present in a multiple spindle camshaft-type machine.

Where the number of identical parts which are to be made is not so large, however, the multiple spindle machine, because of the extensive set-up time required to mount the proper gears and cams on the machine, is not practical.

This situation is alleviated by the instant invention. By way of example, it will be assumed that the tools at the first, second, third, and sixth tool slide positions are driven by the camshaft 29, and that the tools at the fourth and fifth positions are driven by the NC motors 43 and 44. Accordingly, tools which are mounted on the tool slide 23 or the cross slide 34 at the first, second, third, and sixth positions are driven by the camshaft 29, and the feed rate for these tools may be altered by means of the signal to the variable speed DC camshaft motor 14 from the microprocessor 63. The ability to vary the tool drive rate may be important when substituting one workpiece material for another. As an example, it may be possible to take a faster cut on a workpiece when the workpiece material is switched from steel to brass; or it may be desirable to vary the feed rate of the tool at different states of the machining operation. In a prior art machine, the rate of tool feed could only be changed by changing the cams in the spindle frame. According to the invention, a tool feed rate cut can be changed by changing the signal from the microprocessor 63 to the camshaft motor 14.

Additionally, since the tools at the fourth and fifth spindle positions 42 are driven by separate NC motors 43 and 44, the feed of the tools at these positions can be independently altered in order to change the shape of the finished part.

As an example, if a tool at the fourth position is a single point tool which cuts a groove in the outer surface of the workpiece, both the width and the depth of the groove can be altered by altering the command signal given by the microprocessor to the fourth position tool. This is substantially simpler and less time consuming than changing the tools and the cams of the machine, and allows an alteration to a single function of the machine to be easily made. This flexibility enables the machine to be cost competitive for smaller batch runs.

The ability to vary the finished position of the tools at the fourth and fifth positions 42 by varying the program which controls the NC motors 43 provides another advantage. Although the locking levers 48 and the detents 49 on the circumference of the spindle assembly 24 are made to high tolerances, it is difficult to eliminate all error in this mechanism which controls the angular position of the spindle assembly on its axis. However, precise measurements can be made to determine the amount of positional error for each of the six spindles at the fourth and fifth positions 42. Since the motors which feed the tools at the fourth and fifth positions are NC controlled, X-axis machining (machining on the radius of the workpiece) can be error compensated by the signal from the microprocessor 63 which controls the NC motors 43.

Referring to FIG. 9, a spindle with a workpiece 81 is shown at the true fourth position. In order to machine a groove 82 in the workpiece, a tool 83 will be advanced by the NC motor 43 until the tip of the tool is at position 84. By way of example, an error X is shown between the desired position 86 of the center of the spindle and the actual position 87 of the center of the spindle.

The same groove 82 may be machined in the workpiece 81 by feeding the tool 83 to the position 88, the compensation in the tool feed from position 84 to position 88 may be effected by a simple alteration of the feed instructions given by the microprocessor 63 to the NC motor 43. In this way, the positional error of all of the spindles at the fourth and fifth positions may be measured in advance; and the program for the NC motors changed accordingly.

Additional flexibility of operation is achieved by providing separate variable speed motors 13 and 14 for the spindle drive and the camshaft. Because the same workpiece can be fabricated in a variety of materials such as brass, steel, aluminum, bronze, etc., different relative spindle speeds and tool feed rates may be required when working on the different materials. The ratio of spindle speed to tool feed rate can be altered as desired by means of the microprocessor 63.

The ability to selectively use the microprocessor 63 to vary the speed of the camshaft motor 14 during indexing provides another advantage. In order to minimize the time required to machine a finished part, the indexing of the spindle assembly from one position to the next is performed as rapidly as possible. In prior art multiple spindle machines, a separate high speed gear set in the power case is coupled to the camshaft by a clutch in order to achieve a high speed drive from the camshaft for the indexing operation. According to the invention, the need for the clutch and high speed gear set is eliminated since the speed of the camshaft motor 14 can be varied by the microprocessor 63 to index the spindle assembly 24 through the Geneva gear 51 at a desired speed. Moreover, the index rate can be varied according to the length of the bar stock which is being fed into the spindle assembly. Six 10-foot lengths of stock cannot be indexed as rapidly as six 2-foot lengths of stock. Accordingly, in a multiple spindle bar machine, the microprocessor 39 can gradually increase the index rate as the bar stock length is consumed by the workpiece fabrication process. This will gradually decrease the cycle time of the machine resulting in greater overall efficiency.

As briefly mentioned above, multiple spindle machines have been designed with NC motors at all of the spindle positions. The feed rate of a tool on a workpiece in such machines is expressed in terms of inches of penetration per minute. The feed rate is often chosen to give the highest SFM without burning a tool or creating a rough or uneven cut. Such a system is unsatisfactory for precision work since power supply fluctuations can cause spindle speed to vary, with the result that the tool feed rate may be too fast or too slow because the spindle speed is not constant. The system of the instant invention precludes this undesirable result. According to the invention, the spindle speed is constantly monitored by the resolver 61 on the spindle motor 13. The feedback from the spindle motor 13 to the microprocessor 63 allows the microprocessor 63 to control the speed of the camshaft 29 and the speed of the NC motors 43 and 44 and thus the feed rate of all of the tools as a function of the spindle speed. Moreover, this allows the machine to be programmed in terms of inches of tool feed per revolution rather than inches of tool feed per minute.

Having thus described the invention, various alterations and modifications thereof will occur to those skilled in the art, which alterations and modifications are intended to be within the scope of the invention as defined by the appended claims.

What is claimed is:

1. A control and drive system for a multiple spindle machine having a plurality of spindles mounted in a spindle assembly which sequentially indexes workpieces which are mounted in and driven by the spindles through a plurality of spindle stations by rotating the spindle assembly around its axis, the control and drive system comprising:
   a first variable speed motor for driving the spindles,
   a tool slide and a first set of tools mounted on the tool slide,
   a main cam for reciprocating the tool slide and the first set of tools relative to the spindle assembly,
   a camshaft for driving the main cam,
   a second variable speed motor for driving the camshaft,
   control means for independently controlling the speeds of the first and second variable speed motors, whereby the spindle speed and the camshaft speed may be independently varied at any time during a machining cycle.

2. The control and drive system of claim 1 further comprising:
   a second set of tools mounted around the spindle assembly, and
   a third variable speed motor for driving one of said second set of tools, whereby the speed of the third variable speed motor may be independently varied at any time during a machining cycle by the control means.

3. The control and drive system of claim 1 further comprising:
   first resolver means for monitoring the rotation of the first variable speed motor,
   second resolver means for monitoring the rotation of the second variable speed motor,
   first means for coupling the first resolver to the control means, and
   second means for coupling the second resolver to the control means.

4. The control and drive system of claim 1 further comprising:
   an indexing mechanism for the spindle assembly, said indexing mechanism being driven through the camshaft by the second variable speed motor, whereby the speed of indexing can be increased by increasing the speed of camshaft independently of the speed of spindle drive motor assembly.

5. A method of machining a workpiece which is mounted in and driven by a spindle in the spindle assembly of a multiple spindle machine having a mechanism for indexing the spindle assembly, a spindle shaft for workpiece rotation, and a camshaft for tool feed and for driving the indexing mechanism, comprising the steps of:
   (1) rotating the workpiece at a first spindle station at a first speed to machine a first portion of the workpiece,
   (2) rotating the camshaft at a second speed during step 1,
   (3) rotating the workpiece at the first spindle station at an initial third speed to machine a second portion of the workpiece, and
   (4) rotating the camshaft at an initial fourth speed during step 3.

6. The method of claim 5 further comprising the step of:
   (1) rotating the camshaft at a fifth speed to index the spindle assembly.

7. The method of claim 5 further comprising the step of:
   (1) linearly increasing the initial third speed of the workpiece in step 3 to maintain a constant surface feet per minute as the radius of the workpiece decreases.

8. The method of claim 7 further comprising the step of:
   (1) linearly increasing the initial fourth speed of the camshaft in step 4 to maintain a constant rate of penetration of the tool.

9. A method of machining bar stock workpieces on a multiple spindle bar machine having a spindle assembly, a plurality of spindles for receiving and driving the bar stock, an index mechanism for rotating the spindle assembly, a plurality of tools, a camshaft for feeding the tools into the workpieces and driving the index mechanism, a spindle motor, and a variable speed camshaft motor, comprising the steps of:
   (1) driving the camshaft motor at a first speed to feed the tools into the workpieces,
   (2) driving the camshaft motor at a second speed to index the spindle assembly,
   (3) repeating step 1, and
   (4) gradually increasing the second speed of the camshaft motor to increase the speed of indexing as the bar stock workpieces are consumed by the machining operation.

10. A method of machining a plurality of workpieces which are mounted in and driven by the spindles of a multiple spindle machine having a spindle assembly, a spindle motor for spindle and workpiece rotation, a camshaft motor for tool feed of a first set of tools, and a plurality of NC motors for tool feed of a second set of tools, comprising the steps of:
    (1) rotating the workpieces at a first speed with the spindle motor,
    (2) feeding the first set of tools into the workpieces with the camshaft motor during step 1,
    (3) stopping the camshaft motor,
    (4) feeding the second set of tools into the workpieces using the NC motors during step 3, and
    (5) performing steps 1–4 while keeping the spindle assembly in a fixed position.

11. The method of claim 10 further comprising the step of:
    (1) varying the speed spindle motor during step 4.

* * * * *